United States Patent [19]

Suzuki

[11] 4,060,642
[45] Nov. 29, 1977

[54] CONCENTRATED PROTEINACEOUS FOOD MATERIAL FROM MARINE ANIMAL MEAT

[75] Inventor: Taneko Suzuki, Tokyo, Japan

[73] Assignee: Tokai Regional Fisheries Research Laboratory, Tokyo, Japan

[21] Appl. No.: 637,310

[22] Filed: Dec. 3, 1975

[30] Foreign Application Priority Data

Dec. 16, 1974 Japan .................. 49-144219
June 18, 1975 Japan .................. 50-74729

[51] Int. Cl.² .................. A23J 3/00; A23L 1/325
[52] U.S. Cl. .................. 426/104; 426/643; 426/646; 426/429; 426/574; 426/802
[58] Field of Search .............. 426/104, 643, 645, 646, 426/574, 429, 802; 260/112 R

[56] References Cited

U.S. PATENT DOCUMENTS

| | | | |
|---|---|---|---|
| 2,813,027 | 11/1957 | Galliver et al. | 426/643 X |
| 3,620,767 | 11/1971 | Swartz | 426/643 X |
| 3,707,381 | 12/1972 | Sharp | 426/429 X |
| 3,798,126 | 3/1974 | Gasser et al. | 260/112 R X |
| 3,879,370 | 4/1975 | Carpenter et al. | 426/429 X |
| 3,892,866 | 7/1975 | Kanemitsu | 426/643 X |
| 3,922,372 | 11/1975 | Hasegawa | 426/643 X |

FOREIGN PATENT DOCUMENTS

| | | | |
|---|---|---|---|
| 50-19618 | 7/1975 | Japan. | |
| 804,013 | 11/1958 | United Kingdom | 426/429 |

*Primary Examiner*—Raymond N. Jones
*Assistant Examiner*—Esther M. Kepplinger
*Attorney, Agent, or Firm*—Lane, Aitken, Dunner & Ziems

[57] ABSTRACT

A concentrated proteinaceous food material which is suitable for the production of various cooking foodstuffs resembling those of livestock meat which has a texture like that of livestock meat and which shows an excellent water-retaining property is obtained by adding to marine animal meat an edible salt to adjust pH value of said meat in the range of from 6.5 to 7.7 and removing fats and water by use of a hydrophilic organic solvent. In one embodiment the pH of the marine animal meat is adjusted to a value in the range of from 7.2 to 7.7 by using, as the edible salt, a bicarbonate and, at the same time, mixing the meat with common salt or a sucrose fatty acid ester to convert the meat into a meat paste and subsequently removing fats and water by use of a hydrophilic organic solvent.

10 Claims, No Drawings

CONCENTRATED PROTEINACEOUS FOOD MATERIAL FROM MARINE ANIMAL MEAT

FIELD OF THE INVENTION

The present invention relates to a concentrated proteinaceous food material obtained from marine animal meat and possessing of a texture similar to that of livestock meat. More particularly, this invention relates to a concentrated proteinaceous food material which, when cooked with heat, produces foodstuffs similar to those of livestock meat and further to a method for the manufacture of such food material.

BACKGROUND OF THE INVENTION

Various methods hve been proposed for producing a concentrated proteinaceous food material by treating fish meat with organic solvents such as ethanol, n-butanol and hexane to remove fats and water. The products obtained by these methods, however, are deficient in water-retaining ability are similar in texture to fish meal and are unsuitable for cooking. Therefore they have little practical value.

BRIEF SUMMARY OF THE INVENTION

It is, therefore, a primary object of the present invention to provide, by using marine animal meat as the starting material, a concentrated proteinaceous food material having water-retention and texture suitable for the production of various processed foodstuffs similar to those of livestock meat. The other objects of the present invention will become apparent from the following description of the invention.

The present invention is characterized by the fact that the treatment for removing fats and water from marine animal meat by use of a hydrophilic organic solvent is effected only after the meat has been treated with an edible salt to adjust the pH to a value in the range of from 6.5 to 7.7. In one embodiment of the present invention the treatment for removal of the fats and water from marine meat by use of the hydrophilic organic solvent is carried out after the meat has had its pH value adjusted in the range of from 7.2 to 7.7 by use of a bicarbonate as the edible salt and common salt or a sucrose fatty acid ester is subsequently mixed with the meat to produce a meat paste.

Moreover, the concentrated proteinaceous food material obtained as described above possesses a texture substantially different from that of the marine animal meat used as the starting material and exhibits specific properties different from those of the conventional processed foodstuffs derived from marine animal meat.

DETAILED DESCRIPTION OF THE INVENTION

The marine animals which provide a meat usable as the raw material for the purpose of the present invention are distributed over a wide spectrum of animal species such as, for example, fishes, whales and aquatic mollusks. It is nevertheless preferable to use the meat of fish which are caught abundantly and which have a low fat content. Examples of such fishes include Alaska pollack, cod, merluza and other small pelagic fish are horse mackerel, sardine, mackerel and caplin. The meat of sharks and whales are also preferred starting materials. The meat of these marine animals is subjected to a preliminary treatment to impart to the meat the particular texture which the final food material is expected to acquire. This preliminary treatment may comprise mincing, bleaching in water as circumstances require or chopping.

According to the present invention, the marine animal meat is first treated with an edible salt to adjust the pH to a value in the range of from 6.5 to 7.7 as described above. The edible salts which can be used for this purpose include common salt (NaCl), sodium glutamate, sodium pyrophosphate, potassium pyrophosphate, calcium pyrophosphate, sodium polyphosphate, potassium polyphosphate, calcium polyphosphate, sodium bicarbonate and ammonium bicarbonate. Although the amount of such edible salt used varies with the particular kind of raw meat to be used, it is generally preferred to fall in the range of from 0.01 to 3% by weight based on the raw meat. Two or more of such edible salts may be used simultaneously in the form of a mixture. The raw meat which has thus had its pH value adjusted as described above is then treated with a hydrophilic organic solvent to remove fats and water. The hydrophilic organic solvent to be used in this treatment is preferably selected from among the aliphatic compounds such as methanol and ethanol which have short carbon chains. For effective treatment for removal of fats and water, the raw meat and the organic solvent in an amount from three to ten times as large (by weight) are brought into intimate contact with each other as by agitation for a period of 30 seconds to 15 minutes. To preclude possible denaturation of proteins in the raw meat during this treatment as much as possible, it is preferable that the organic solvent be cooled to 0° to 5° C before it is mixed with the meat. For the purpose of ensuring more effective removal of fats and water from the raw meat, the meat which has been treated with the organic solvent as described above may be separated from the used organic solvent and thereafter may be washed with the same organic solvent in an amount from three to ten times as large (by weight).

When the adjustment of the pH value of the raw meat described above is effected by use of an alkali such as a caustic alkali, for example, the product obtained by the subsequent treatment with the organic solvent enjoys an unusually high water-retaining property. Nevertheless, this product has a serious drawback in that the foodstuff obtained by cooking this product fails to acquire the same gumminess and tenderness as livestock meat. When the adjustment of the pH value is carried out by use of an alkali such as a phosphate, the product obtained by the subsequent treatment with the organic solvent is a foodstuff which is hard and destitute of tenderness when cooked. This foodstuff has a texture different from that of livestock meat.

The product which is obtained by extracting fats and water from the meat paste by use of the organic solvent as described above is squeeze-filtered to remove the remaining organic solvent and is then left to dry in an air dryer or a vacuum dryer at a temperature below normal room temperature. Consequently, there is obtained a white to light yellow concentrated proteinaceous material. The drying is continued until the water content falls below 25%, preferably in the range of from 12 to 5%. This concentrated proteinaceous material has a protein content (determined by the Kjeldahl method) of not less than 75% and exhibits a high water-retaining property. When the proteinaceous material is mixed with cold water in an amount at least equivalent thereto and then left to stand at normal room temperature for 15 minutes or more, it gains three to five times in weight and acquires a texture similar to that of livestock meat. The proteinaceous material which is reconstituted with water as described above is found, by observation through an optical microscope, to have a textural structure wherein an amorphous aggregate of meat protein is dotted with muscle fibers. This is a specific structure which differs from that of the marine animal meat from that of the conventional processed meat foodstuffs. In this connection, it is noted that sausage has a structure consisting of a substantially amorphous aggregate of meat protein, ham has a structure consisting nearly completely of muscle fibers and KAMABOKO (a meat product obtained by thermally gelling ground fish meat) has a structure consisting of a reticular aggregate of protein and no muscle fibers.

When a bicarbonate such as, for example, sodium bicarbonate or ammonium bicarbonate is used as the edible salt in the present invention, the marine animal meat is treated with this salt to adjust the pH to a value in the range of from 7.2 to 7.7. Subsequently, the raw meat is mixed with common salt or a sucrose fatty acid ester and thereby converted into a meat paste and the meat paste is deprived of fats and water by extraction with the hydrophilic organic solvent. When the meat paste is formed using common salt, the raw meat and common salt are thoroughly kneaded until the mixture assumes the form of paste. When the meat paste is formed by use of a fatty acid ester of sucrose, the raw meat is ground in advance to a uniform consistency, then mixed with the ester, and thereafter kneaded until a homogeneous meat paste is obtained. The common salt or fatty acid ester of sucrose thus used in the present invention serves the purpose of conferring to the proteinaceous material a consistency and gumminess simlar to that of livestock meat. The amount of common salt used preferably falls in the range of from 0.5 to 2% by weight and that of the fatty acid ester of sucrose in the range of from 0.2 to 1% by weight respectively based on the raw meat used. Examples of the sucrose fatty acid esters which are suitable for the purpose of this invention include sucrose monopalmitate and sucrose distearate.

The required removal of water and fats from the meat paste by use of the hydrophilic organic solvent may then effectively be carried out by following the procedure described above. In this case, however, the meat paste and the organic solvent are preferred to be held in intimate contact with each other for a period of ten-odd minutes.

When the meat of a marine animal such as mackerel or sardine or a marine animal meat notably degraded in freshness is used as the raw material, the meat paste produced as described above is preferred to be held at normal room temperature for two to three hours or to be left to stand at a still lower temperature for 10 to 48 hours so as to be gelled before it is subjected to extraction with the organic solvent. This is because such seafood meat tends to lose gumminess in the treatment with the organic solvent and, therefore, the meat paste must be gelled in order to regain the gumminess.

The product obtained as described above is squeeze-filtered to remove the remaining organic solvent and then left to dry at a temperature below normal room temperature. Consequently, there is obtained a concentrated proteinaceous material having a protein content of not less then 75% and a textural structure of outstanding water-retaining property similarly to the product described previously. This concentrated proteinaceous material has a peculiar nature such that, upon exposure to heat in the course of cooking, it forms a foodstuff quite similar to that of livestock meat.

As described already, the concentrated proteinaceous material obtained by the present invention has a high protein content and a high water-retaining property and is readily reconstituted (rehydrated) by incorporation of a suitable amount of water. The reconstituted (rehydrated) material, when cooked with heat, provides various processed foodstuffs of a texture similar to that of livestock meat. It is, of course, permissible for this concentrated proteinaceous material to be mixed with livestock meat and utilized for the manufacture of various processed foodstuffs.

According to the present invention, therefore, a concentrated proteinaceous food material useful as the raw material for various processed foodstuffs such as meat loaf, varieties of Chinese meat-containing flour dumplings, hamburger steak and meat sauce can be obtained from the marine animal meat. Thus, this invention serves the purpose of increasing the utility of marine animal meat.

The present invention will now be described specifically with reference to working examples. This invention, however, should not be construed as being limited to these examples.

EXAMPLE 1

A 12 kg portion of shark meat was treated on a 4 mm chopper to obtain 3 kg of boneless shark meat. This meat was mixed first with 2% (by weight) of common salt and 0.3% (by weight) of monosodium glutamate to shift the pH value of the meat to the alkaline side, mixed thoroughly with 0.5% (by weight) of sodium bicarbonate to adjust the pH value to 7.4. The meat thus obtained was mixed with 9 liters of cooled ethanol, agitated gently and filtered through a cloth. The filtration residue was further washed with 9 liters of cooled ethanol and subsequently left to dry in an air dryer at 25° to 30° C. Consequently, there was obtained about 300 g of a white concentrated proteinaceous material. When 100 g of the concentrated proteinaceous material was mixed with water in an amount to give a water content of 65 to 70% (by weight), there was obtained a food material possessing a texture similar to that of livestock meat. Foodstuffs such as meat loaf, varieties of Chinese meat-containing flour dumplings, hamburger steak and meat sauce were prepared by using the food material as a substitute for 10 to 20% (by weight) of livestock meat. When these food-stuffs were subjected to sensory test, the results were the same as those obtained of reference products (derived without using the concentrated proteinaceous material as a substitute).

EXAMPLE 2

A 2.5 kg portion of boneless meat of Alaska pollack was gently adjusted with four times its weight of cool water for one minute. Common salt in an amount of 0.5% (by weight) based on the bleaching water was added to aid in removal of water from the meat. The mixture was placed in a bag of filter cloth and left to stand overnight to separate the meat by filtration, giving rise to a meat having a water content of 82%. This meat was mixed with 1% (by weight) of common salt and 0.5% (by weight) of sodium bicarbonate to adjust the pH to 7.4, and the resultant mixture was thoroughly kneaded to produce a viscous meat paste. Ethanol of an amount three times as large as that of the meat paste was cooled to about 5° C. Into the cooled ethanol, aliquots of the meat paste were placed, one at a time, and gently agitated for 15 minutes. The resultant mixture was filtered through a filter cloth to remove the ethanol. The filtration residues were combined. The combined residue was washed with ethanol cooled in advance to 5° C and incorporated in the same amount as used previously. The washed residue was squeeze-filtered to separate the remaining ethanol therefrom. The residue was dehydrated in an air dryer at 25° C to 30° C, to produce 450 g of a concentrated proteinaceous material having a water content of 12%. When the material was assayed for amino acid composition, it was revealed that the balance of essential amino acids in the material was substantially the same as in the fish meat used as the starting material.

One part of the concentrated proteinaceous material thus obtained was mixed with 4 parts of water and left to stand at normal room temperature for 15 minutes. By the end of this period, the proteinaceous material had absorbed water to saturation and had assumed a form similar to fresh meat. The resultant reconstituted (rehydrated) meat was mixed with a mixed ground meat of beef and pork, of 20 parts of the former to 80 parts of the latter by weight and processed to produce meat loaf, hamburger steaks and meat dumplings. The products thus obtained were subjected to sensory tests which revealed that those products incorporating the concentrated proteinaceous material were indistinguishable in terms of palatability from the reference products prepared from the mixed ground meat of pork and beef.

EXAMPLE 3

A 1 kg portion of boneless meat of Alaska pollack was mixed with % (by weight) of common salt and about 0.5% (by weight) of sodium bicarbonate to adjust the pH value of the meat to 7.6. The meat thus prepared was mixed with 0.7% (by weight) of beef extract (Beef-X FW-10 manufactured by NIKKEN FOOD CO.) and thoroughly kneaded to form a meat paste. Into 3 liters of ethanol cooled in advance to 5° C, aliquots of the meat paste were introduced one at a time and agitated gently for 15 minutes. The resultant mixture was filtered through a filter cloth to remove the ethanol. The residue of filtration was then washed with ethanol cooled in advance to 5° C and squeezed in a bag of filter cloth to remove the remaining ethanol therefrom. The residue consequently obtained was dehydrated by an air dryer at 25° C to 30° C, to produce 165 g of a brown concentrated proteinaceous material. This material was found to have a water content of 10% and a protein content of 85%. It was mixed with four times its weight in water and then left to stand for about 10 minutes. By the end of this standing, the material absorbed water to saturation and assumed the appearance of livestock meat. A 200 g portion of the reconstituted (rehydrated) material was mixed with 12 g of cabbage, 10 g of leak, 2 g of ginger, 9 cc of soy sauce, 9 cc of SAKE (fermented liquor made in Japan from rice), 3 g of common salt and 3 g of sugar. From the resultant mixture, SHUMAI (a variety of Chinese meat-containing flour dumpling) was made. When the SHUMAI thus prepared was subjected to sensory test, it was revealed that it was not significantly different in terms of palatability from the control SHUMAI produced by using a mixed meat (7:3) of beef and pork.

EXAMPLE 4

By following the procedure of Example 2, 3.4 kg of bleached meat was obtained from the boneless meat of sardine. This bleached meat was mixed with 1% (by weight) of common salt and 0.1% (by weight) of ammonium bicarbonate and thoroughly kneaded to produce a viscous meat paste. The meat phase thus produced was left to stand in a refrigerator kept at 5° C for 24 hours to gel. Consequently, there was obtained a jelly having a glossy surface. In 10 liters of ethanol cooled in advance to 5° C, small aliquots of the jelly-like meat were placed one at a time and agitated gently for 15 minutes. The resultant mixture was filtered through a filter cloth to remove ethanol therefrom. The residue was once again washed with 10 liters of ethanol at 5° C, squeeze-filtered to remove the remaining ethanol therefrom and left to dry in a draft. There was consequently obtained 530 g of a concentrated proteinaceous material having a water content of 11%.

EXAMPLE 5

A 1 kg portion of boneless meat of Alaska pollack was mixed with 1% by weight of sucrose monopalminate and 0.5% by weight of sodium bicarbonate to adjust the pH value of the meat adjusted to 7.4. The mixture was thoroughly kneaded to form a meat paste. The meat paste thus produced was immediately placed in a room kept at 5° C and left to stand therein for 1 hour. As a result of this standing at the lowered temperature, the meat paste acquired the form of jelly. Into 3 liters of ethanol cooled in advance to 5° C, small aliquots of the jelly-like fish meat were placed one at a time and gently agitated for 15 minutes. The resultant mixture was filtered through a filter cloth so as to remove ethanol therefrom. The residue was washed with ethanol cooled in advance to 5° C. After the washing, the residue was squeeze-filtered to remove the remaining ethanol therefrom.

When the residue thus obtained was dehydrated by the air dryer at 25° C, there was obtained 170 g of light yellow granules of concentrated proteinaceous material.

What is claimed is:

1. A method for the manufacture of a concentrated proteinaceous food material suitable for the production of processed foodstuffs which, when reconstituted with water, assumes a textural structure wherein an amorphous aggregate of meat protein is dotted with muscle fibers, resembling that of livestock meat, which method comprises mixing minced marine animal meat with an edible salt to adjust the pH of said meat to a value in the range of from 6.5 to 7.7, said edible salt being selected from the group consisting of common salt, monosodium glutamate, pyrophosphates and polyphosphates then kneading the mixture and contacting the resultant meat with a hydrophilic organic solvent precooled to 0° to 5° C and in an amount sufficient to extract fats and water, and drying the extracted meat thereby producing the proteinaceous food material.

2. The method according to claim 1, wherein said hydrophilic organic solvent is one member selected from the groug consisting of methanol and ethanol.

3. A method for the manufacture of a concentrated proteinaceous food material having properties suitable for the production of processed foodstuffs having a structure wherein an amorphous aggregate of meat protein is dotted with muscle fibers, resembling that of livestock meat, which method comprises mixing minced marine animal meat with a bicarbonate to adjust the pH of the meat to a value in the range of from 7.2 to 7.7 and mixing therewith an additive selected from the group consisting of common salt and sucrose fatty acid esters and kneading the mixture to convert the mixture into a meat paste, and contacting the meat paste with a hydrophilic organic solvent precooled to 0° to 5° C and in an amount sufficient to extract fat and water and drying the extracted meat to produce the proteinaceous food material.

4. The method according to claim 3, wherein said bicarbonate is one member selected from the group consisting of sodium bicarbonate and ammonium bicarbonate.

5. The method according to claim 3, wherein said additive is common salt added to the marine animal meat in an amount of 0.5 to 2% by weight based on said meat.

6. The method according to claim 3, wherein said additive is fatty acid ester of sucrose added to the marine animal meat in an amount of from 0.2 to 1% by weight based on said meat.

7. The method according to claim 3, wherein said meat paste is gelled and thereafter contacted with said hydrophilic organic solvent.

8. The method according to claim 7, wherein said gelling is carried out at normal room temperature for two to three hours or at a temperature lower than the room temperature for 10 to 48 hours.

9. The concentrated proteinaceous food material produced by the process of claim 1 and characterized by a protein content of at least 75% and a water content of 25% or less.

10. The food material obtained by mixing the concentrated food material of claim 9 with 3 to 5 times its weight of water and having a structure characterized by an amorphous aggregate of meat protein dotted with muscle fibers.

* * * * *

UNITED STATES PATENT AND TRADEMARK OFFICE
CERTIFICATE OF CORRECTION

PATENT NO. : 4,060,642
DATED : November 29, 1977
INVENTOR(S) : TANEKO SUZUKI

It is certified that error appears in the above-identified patent and that said Letters Patent are hereby corrected as shown below:

Column 1, line 8, after "possessing" delete "of";
line 62, delete "fishes include" and insert --fish are--;
line 63, delete "are" and insert --including--.

Column 4, line 57, delete "adjusted" and insert --agitated--.

Column 6, line 26, delete "adjusted";
line 63, change "groug" to --group--.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*